US006173993B1

(12) United States Patent
Shumard et al.

(10) Patent No.: US 6,173,993 B1
(45) Date of Patent: Jan. 16, 2001

(54) JOINT RESTRAINT

(75) Inventors: Dennis D. Shumard; Michael L. Lundstrom, both of Eastland, TX (US)

(73) Assignee: EBAA Iron, Inc., Eastland, TX (US)

( * ) Notice: Under 35 U.S.C. 154(b), the term of this patent shall be extended for 0 days.

(21) Appl. No.: 09/254,408

(22) PCT Filed: Sep. 5, 1997

(86) PCT No.: PCT/US97/15663

§ 371 Date: Jun. 11, 1999

§ 102(e) Date: Jun. 11, 1999

(87) PCT Pub. No.: WO98/10211

PCT Pub. Date: Mar. 12, 1998

Related U.S. Application Data (60) Provisional application No. 60/025,571, filed on Sep. 6, 1996.

(51) Int. Cl.[7] ..................................................... F16L 17/00
(52) U.S. Cl. ............................ 285/23; 285/337; 285/404
(58) Field of Search ............................. 285/23, 337, 368, 285/374, 404, 421

(56) References Cited

U.S. PATENT DOCUMENTS

| 4,092,036 | 5/1978 | Sato et al. . |
| 4,664,426 | 5/1987 | Ueki . |
| 5,071,175 | 12/1991 | Kennedy, Jr. . |
| 5,431,453 | 7/1995 | Yamashita et al. . |
| 5,544,922 | 8/1996 | Shumard et al. . |

*Primary Examiner*—Dave W. Arola
(74) *Attorney, Agent, or Firm*—Randall C. Brown; Alvin R. Wirthlin; Akin, Gump, Strauss, Hauer & Feld, L.L.P.

(57) ABSTRACT

A joint restraint (10) for securing a first pipe (12) to a second pipe. The joint restraint (10) includes an annular body (14) and a plurality of wedge housings (18) extending from the annular body (14) and characterized by open rear faces (38) to allow coreless casting. A bolt (32) is disposed within a hole (30) in each wedge housing (18) and a wedge (40) is disposed within each wedge housing (18). Each wedge (40) has a bolt-actuated tooth (52), a larger pressure-actuated tooth (54), a top surface (44) having a groove (48) adapted to slidably receive a bolt actuator (32), and a bottom surface (42) that is partially tapered to act as a bearing (76) limiting the extent of bolt-driven actuation.

36 Claims, 6 Drawing Sheets

JOINT RESTRAINT

This application claims benefit to provisional application Ser. No. 60/025,571 filed Sep. 6, 1996.

BACKGROUND OF THE INVENTION

1. Field of the Invention

The present invention relates to a joint restraint for connecting a pair of axially aligned pipes and/or appurtenances such that a tight fit and suitable seal are formed therebetween, and such that protection is provided against the disengagement that could occur when force is applied in the axial direction.

2. Description of Related Art

It is known to employ a joint restraint to prevent disengagement of axially aligned pipes and/or appurtenances. For purposes of this application, pipes and/or appurtenances shall be referred to herein collectively as "pipes" or in the singular as "pipe". Typically, a joint restraint comprises an annular body from which a plurality of evenly spaced wedge housings axially extend. The annular body encircles the outer surface of a first pipe, and is engaged therewith using actuatable wedges held within each of the wedge housings. The annular body is also connected to an integral flange disposed at the terminus of a second pipe, so as to hold the first and second pipes together.

Examples of joint restraints, the pipes with which they function and associated equipment may be found in U.S. Pat. No. 4,092,036 to Sato et al. ("Sato '036"), U.S. Pat. No. 5,071,175 to Kennedy, Jr. ("Kennedy '175"), and U.S. Pat. No. 5,544,922 to Shumard et al. ("Shumard '922"), the entire disclosures of which are incorporated herein by reference.

Joint restraints used in the past have suffered from several disadvantages that have diminished their functionality and ease of use, and that have resulted in increased manufacturing costs. For example, many joint restraints employed in the past required the use of sand cores in casting the wedge housings. Because the use of such sand cores increases processing time and expense, it is desirable to employ a design that minimizes or eliminates the need for such sand cores.

Another disadvantage of joint restraints employed in the past is diminished or unpredictable performance with plastic pipe (e.g., PVC). Many joint restraints rely on friction between a gripping surface or mechanism such as wedges, wedge rings and serrated split rings and the pipe surface to secure the pipe. However, the behavior of such friction-based means is unpredictable when used with PVC, and the friction force that may be induced is limited.

The Kennedy '175 joint restraint addresses this problem by employing a wedge having pipe-engaging teeth that may be driven into engagement with the pipe surface. The Kennedy '175 joint restraint, however, has several disadvantages. Specifically, the design requires the use of sand cores in casting, the design lacks a reliable method of keeping the wedge in place and the wedge does not retract when the actuating screw is retracted.

The Kennedy '175 disclosure contemplates the use of a twist-off bolt to reduce the possibility of preventing the wedge from being over-torqued during initial actuation. Ideally, however, the wedge itself should resist further intrusion into the pipe surface after the initial actuation groove is formed.

Another disadvantage of conventional joint restraints is their lack of flexibility. For example, in the Kennedy '175 patent, once the joint restraint is installed on the pipe, the position of the wedges is fixed, other than a relatively minor amount of radial play, with respect to their respective wedge housings. It is desirable to allow the wedges some freedom to move within their respective housings independently of the joint restraint in order to increase the capacity of the system to accommodate joint deflection resulting from settlement or other force on the pipes. Likewise, it is advantageous to allow some play in the radial displacement of an installed wedge in order to accommodate greater variations in pipe size without the need for shims or spacers.

Yet another disadvantage of conventional joint restraints is the typical lack of means for retaining wedges or other restraint means in their respective housings prior to installation in the field. Such retaining means are desirable in order to allow preassembly of wedges into a joint restraint, and to reduce the likelihood of subsequent wedge loss.

A need exists, therefore, for a simple and robust joint restraint that provides reliable restraint, that minimizes the use of cores in molding, that is easy to assemble, install and use, and that is multi-functional and flexible with respect to pipe size and type. Such a device should also provide a mechanism for retaining wedges in their housings prior to or after installation.

SUMMARY OF THE INVENTION

The apparatus of the present invention overcomes the above-mentioned disadvantages and drawbacks which are characteristic of the related art.

In a preferred embodiment, the joint restraint of the present invention comprises an annular body having a plurality of axially extending wedge housings. The annular body is adapted to encircle and engage the end of a first pipe, and to connect to the terminal flange of a second pipe in the manner contemplated by the Sato '036 and Kennedy '175 patents. In a preferred embodiment, the wedge housings are uniformly distributed around the annular body and each wedge housing defines a pocket adapted to receive a bolt and a wedge.

In a preferred embodiment, the pocket defined by the wedge housing has no radially inner surface, being bounded instead by the outer surface of the first pipe when installed. In a preferred embodiment, the wedge pocket face opposite the annular extension is also open, allowing for coreless casting of the wedge housings.

In a preferred embodiment, a bolt hole passes through the radially outer wall of the wedge pocket. During actuation, the bolt is inserted through the hole, into the wedge pocket and towards the pipe. Preferably, the hole and bolt are threaded so that the bolt may be threadedly engaged within the bolt hole. The wedge, which is disposed between the end of the bolt and the pipe surface, is thus acted upon by the bolt.

Each wedge comprises a radially outer top surface, a front surface which faces into the pocket, an opposite rear surface, two side surfaces, and a bottom surface. The top surface of the wedge is adapted to receive the end of the bolt. Preferably, a groove is disposed in the top surface of the wedge and is adapted to receive the end of the bolt. The groove preferably inclines with respect to the bottom surface from the rear surface to the front surface of the wedge. As the end of the bolt moves from the rear surface to the front surface of the wedge, the wedge exerts an increasing grip on the pipe. The orientation of the groove is such that, in an initial set position, the groove at the rear surface of the wedge is radially closer to the pipe surface than the groove at the front surface of the wedge.

In a preferred embodiment, the bottom surface of the wedge is curved to correspond to the curvature of the outer surface of the pipe, and comprises two parallel pipe-engaging teeth. The first tooth is disposed below the groove and is adapted to penetrate the pipe surface upon initial actuation of the wedge.

In a preferred embodiment, the second tooth is disposed between the first tooth and the front of the wedge. The second tooth is larger than the first, and only penetrates the pipe surface after pressurization. Although the second tooth may contact the pipe surface before the first tooth during actuation, the second tooth does not penetrate the pipe surface. Instead, the wedge rotates to focus penetrating force at the first tooth.

In a preferred embodiment, a tapered portion at the bottom of the wedge extends from the first tooth to the rear surface of the wedge and acts as a large bearing area when the bolt operates upon the wedge. The bearing is seated against the pipe surface when the first tooth is fully embedded, and provides resistance to further torque on the bolt by distributing the load over a large surface.

Once the wedge is actuated, motion of the first pipe away from the second pipe causes the first pipe to shift relative to the annular body. This is because the connection between the annular body and the flanged end of the second pipe is relatively rigid. The wedge, on the other hand, has a tooth that is embedded in the first pipe, and accordingly tends to travel with the first pipe. As a result, the bolt and annular body slide forward relative to the groove in the wedge.

Forward motion of the bolt in the groove causes the wedge to pivot about the embedded first tooth, and, with sufficient force, causes the larger second tooth to penetrate the pipe surface. When the bolt reaches the front edge of the groove, further motion of the pipe is prevented by interference between the front edge and the bolt. In a preferred embodiment, the interference contact area is increased by adding a raised lip at the front edge of the groove. The raised lip also prevents the wedge from rotating out from under the bolt at high thrust forces.

In a preferred embodiment, retaining means are employed to allow wedges to be held within their respective wedge housings prior to installation. The retaining means preferably comprise a shroud which forms a partial shell around the wedge. The retaining means also preferably hold the wedge in the proper location relative to the bolt regardless of the location of the bolt hole or the deflection of the joint between the first pipe and the second pipe.

In a preferred embodiment, the shroud is secured to the wedge by hooking upturned edges around flanges disposed on the side surfaces of the wedge. In another preferred embodiment, the shroud is secured to the wedge by inserting the upturned edges into grooves disposed on the side surfaces of the wedge. In each of these embodiments, an aperture disposed in the shroud above the groove of the wedge is then disposed on the end of the bolt. The shroud is designed to deform during actuation and operation of the joint restraint, in order to allow rotation and displacement of the wedge.

In another preferred embodiment, the bottoms of the sidewalls of the wedge housing pockets closest to the pipe have projections or grooves in the pocket area. In this embodiment, the shroud engages the projections or grooves to maintain the position of the wedge in the wedge housing pockets.

In still another preferred embodiment of the present invention, the end of the bolt is engaged with the wedge to keep the wedge from coming out of the open back of the pocket. Also a mechanism may be incorporated into the shroud that allows the wedge to spring back into the pocket when the joint restraint is removed from the pipe.

In still another embodiment of the present invention, the shroud is engaged with the wedge, extends within the wedge housing pocket and has a portion that extends out of the wedge pocket and engages with the annular body to maintain the wedge in the wedge pocket.

In a still further embodiment of the present invention, a groove is disposed in the bottom of the wedges and a ring is placed within each groove that interacts with walls of the wedge pocket to maintain each wedge in the wedge pocket.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings.

DESCRIPTION OF THE PREFERRED EMBODIMENTS

Figure 1:
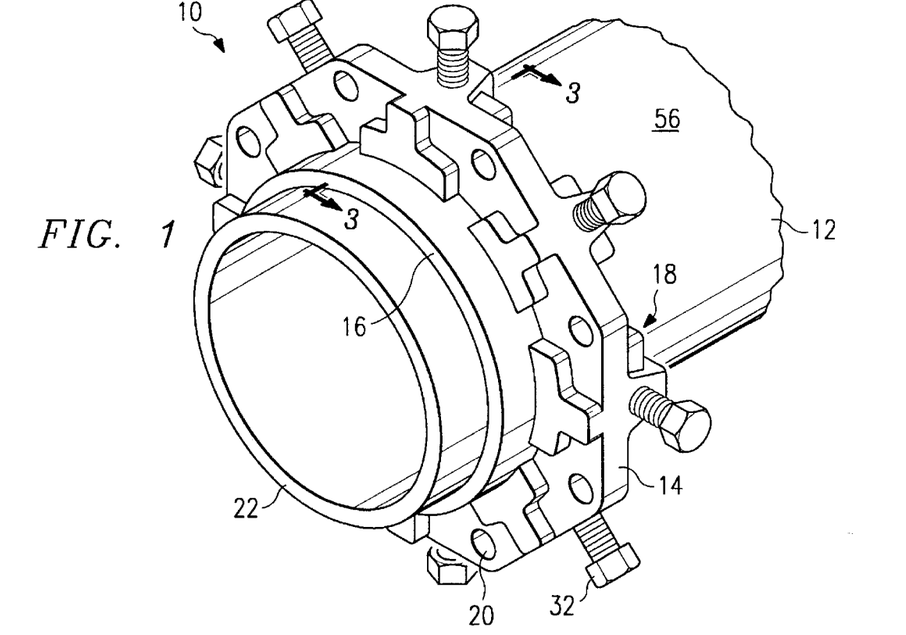
FIG. 1 is a perspective view of a joint restraint according to the present invention.
Figure 2:
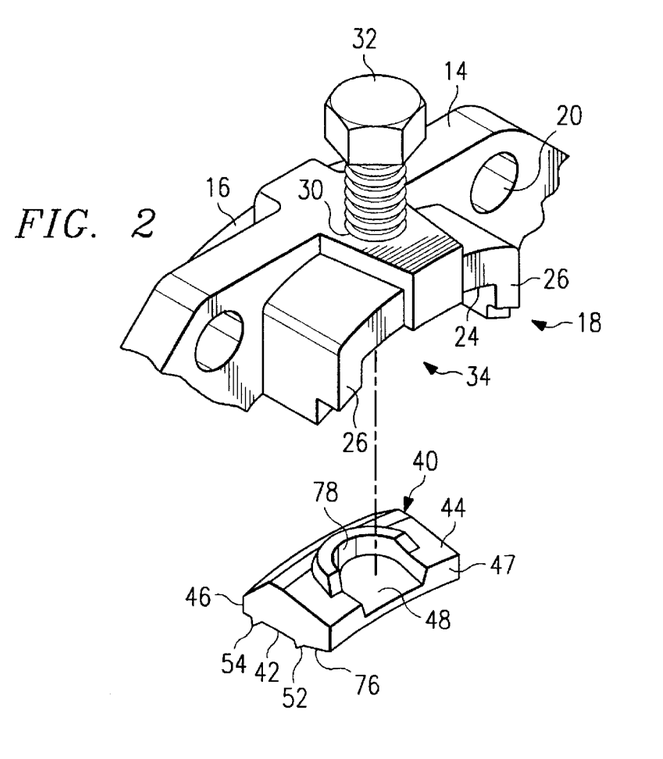
FIG. 2 is an exploded perspective view of a wedge and a wedge housing according to the present invention.

Referring now to the drawings, and particularly to FIGS. 1 and 2, a preferred embodiment of the joint restraint of the present invention is shown and generally designated by the reference numeral 10.

In a preferred embodiment, the joint restraint 10 is disposed on a first pipe 12 and comprises an annular body 14 through which the first pipe 12 passes and from which an annular projection 16 and a plurality of wedge housings 18 extend. A plurality of through holes 20 pass through the annular body 14 and are adapted to receive bolts extending from the flanged terminus of a second pipe (not shown) in the manner contemplated by the Sato '036 and Kennedy '175 patents.

In a preferred embodiment, the wedge housings 18 are uniformly distributed around the annular body 14 and the joint restraint 10 is installed such that the wedge housings 18 extend away from the end 22 of the first pipe 12.

Each wedge housing 18 comprises a top wall 24, two side walls 26, and a front wall 28. The top wall 24 is the radially outer wall of the wedge housing 18 and the front wall 28 is the wall closest to the end 22 of the first pipe 12. The top wall 24 of each wedge housing 18 comprises a hole 30 adapted to receive a bolt 32. In a preferred embodiment and as shown in FIG. 2, the hole 30 and bolt 32 are threaded so that bolt 32 may be threadedly engaged within hole 30.

Each wedge housing 18 defines a wedge pocket 34 characterized by an open bottom 36 opposite the top wall 24 and an open rear face 38 opposite the front wall 28. The use of an open rear face 38 rather than a rear wall allows the wedge housings 18 of the present invention to be cast without using cores.

Each wedge pocket 34 is adapted to receive a wedge 40. The wedge 40 is held within the wedge pocket 34 such that when the joint restraint 10 is installed, the bottom 42 of the wedge 40 faces toward the outer surface 56 of the first pipe 12, the top 44 of the wedge 40 faces the top wall 24 of the wedge housing 18, the front surface 46 of the wedge 40 faces the front wall 28 of the wedge housing 18 and the rear surface 47 of the wedge is opposite the front surface 46.

The top 44 of the wedge comprises a groove 48 adapted to slidably receive the end 50 of the bolt 32. Preferably, the groove 48 has a slope that inclines from the rear surface 47 to the front surface 46 of the wedge 40. In another preferred embodiment, the end 50 of the bolt 32 is flat-bottomed and in still other preferred embodiments suitable for high pressure service, the groove 48 has a slope as noted above and the end 50 of the bolt 32 is conical and preferably has a profile corresponding to the slope of the groove 48.

The bottom 42 of the wedge 40 comprises two pipe-engaging teeth 52 and 54, and in a preferred embodiment, both the bottom 42 and the teeth 52 and 54 are curved or arcuate to conform to the curvature of the surface 56 of the first pipe 12. In a preferred embodiment, the first tooth 52 is disposed below the groove 48. The second tooth 54 extends for a greater distance from the bottom 42 of the wedge 40 than the first tooth 52, and is disposed between the first tooth 52 and the front 46 of the wedge 40.

In a preferred embodiment, a shroud 60, shown in FIGS. 3–9, is employed to hold the wedges 40 in their respective wedge housings 18 and in the proper actuation location prior to installation of the joint restraint 10 on a pipe 12. The shroud 60 preferably comprises a suitable material that allows the shroud 60 to snap fit as described below, and in order to allow flexing during actuation and operation of the joint restraint.

Figure 8:
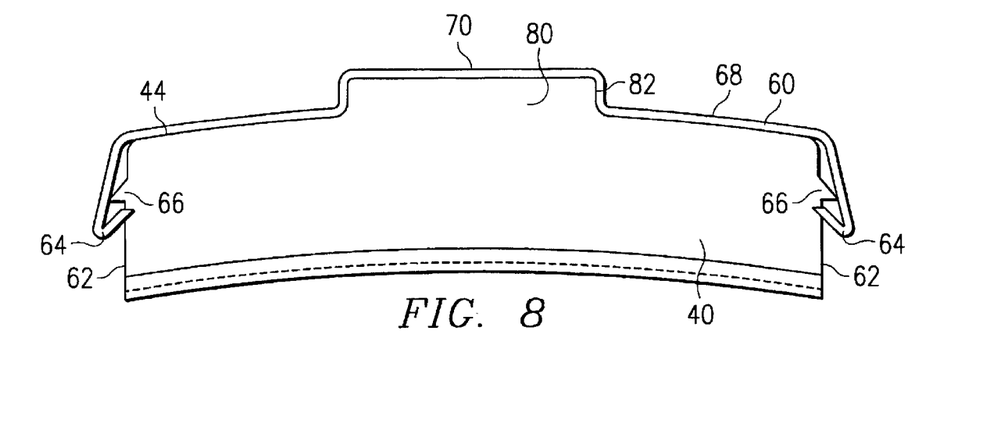
FIG. 8 is a section view of a wedge and shroud according to the present invention.
Figure 9:
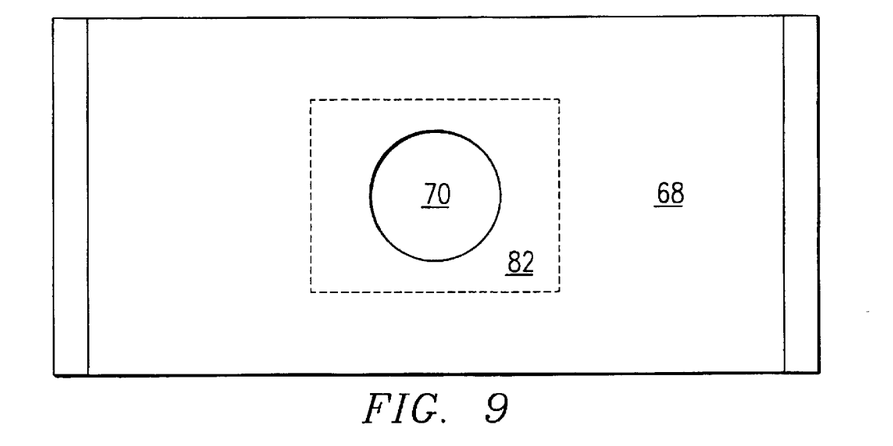
FIG. 9 is a top plan view of a shroud according to the present invention.
Figure 10:
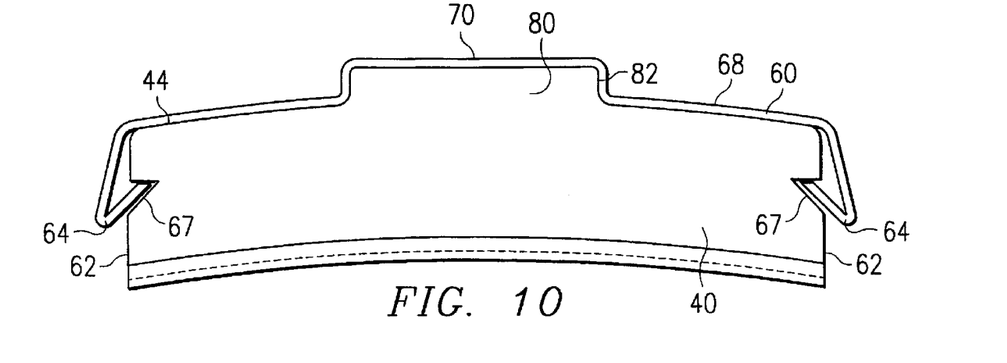
FIG. 10 is a section view of an alternate wedge and shroud according to the present invention.

In a preferred embodiment, the shroud 60 forms a shell around the top 44 and sidewalls 62 of the wedge 40. As shown in FIGS. 8 and 9, the shroud 60 comprises upturned portions 64 and is secured to the wedge 40 by snapping the upturned portions around flanges 66 extending from the sidewalls 62 of the wedge 40. In an alternate embodiment and as shown in FIG. 10, the shroud 60 is secured to the wedge 40 by snapping the upturned portions 64 into grooves 67 disposed in the sidewalls 62 of the wedge 40.

Figure 11:
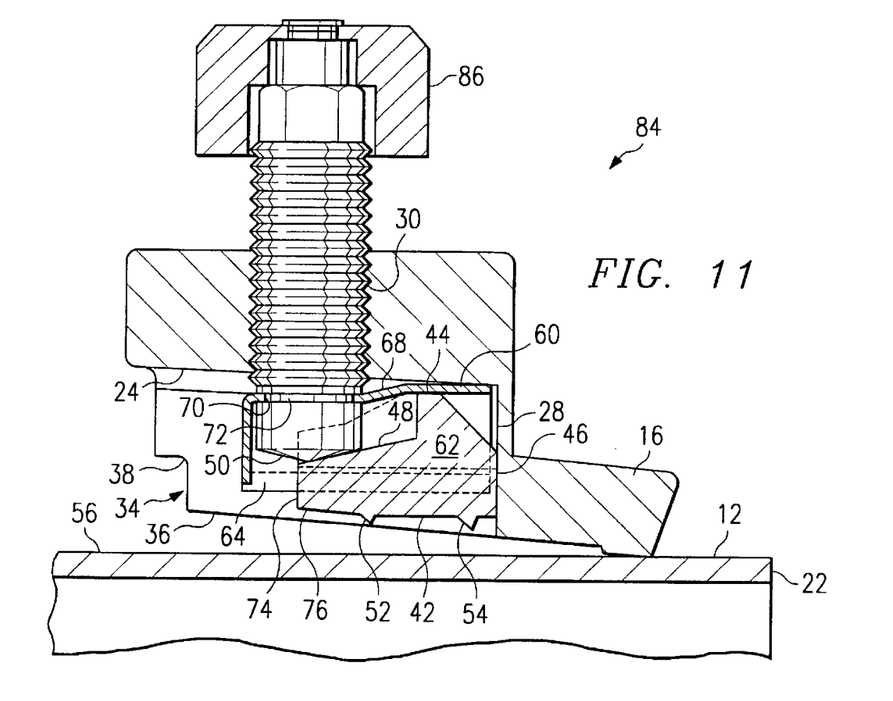
FIG. 11 is a cross section view of an alternate bolt according to the present invention.
Figure 12:
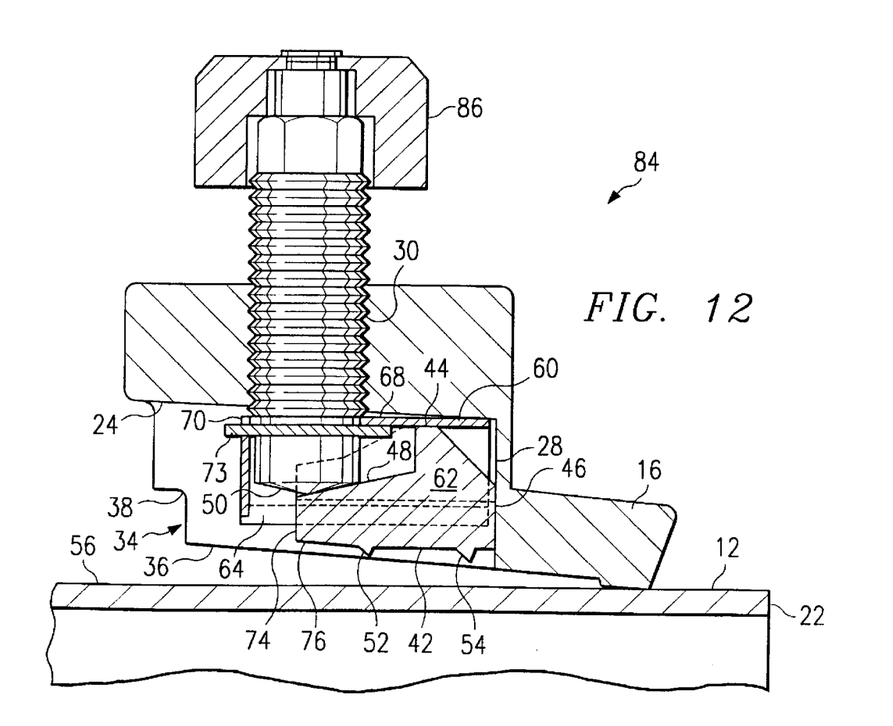
FIG. 12 is a cross section view of another alternate bolt according to the present invention.

In a preferred embodiment, the top surface 68 of the shroud 60 comprises an aperture 70 into which the end 50 of the bolt 32 may be threaded. Alternatively, as shown in FIG. 11, the bolt 32 may comprise a receiving groove 72 around which the aperture 70 of the shroud 60 snaps. In another alternate embodiment and as shown in FIG. 12, the bolt 32 may comprise a flange 73 over which the aperture 70 of the shroud 60 is passed.

In addition, in a manner similar to that disclosed in Shumard '922, the bottoms of the sidewalls of the wedge housing pockets closest to the pipe have projections or grooves in the pocket area. In this embodiment, the shroud engages the projections or grooves to maintain the wedge in the wedge pocket.

In another preferred embodiment of the present invention, the end of the bolt is engaged with the wedge to keep the wedge from coming out of the open back of the wedge pocket. Also a mechanism may be incorporated into the shroud that allows the wedge to spring back into the joint restraint when the joint restraint is removed from the pipe.

In still another embodiment of the present invention, the shroud is engaged with the wedge, extends within the wedge housing pocket and has a portion that extends out of the wedge pocket and engages with the annular body to maintain the wedge in the wedge pocket.

In a still further embodiment of the present invention, a groove is disposed in the bottom of the wedges and a ring is placed within each groove that interacts with the walls of the wedge pocket to maintain each wedge in each wedge pocket.

Figure 3:
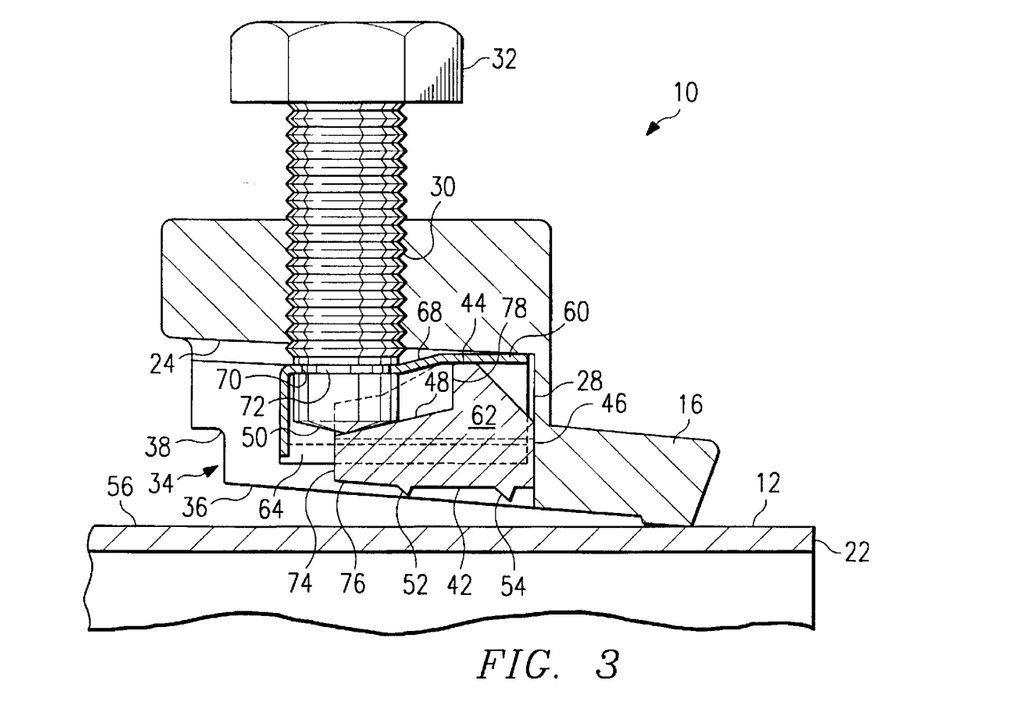
FIG. 3 is a section view of the joint restraint shown in FIG. 1 prior to actuation.
Figure 4:
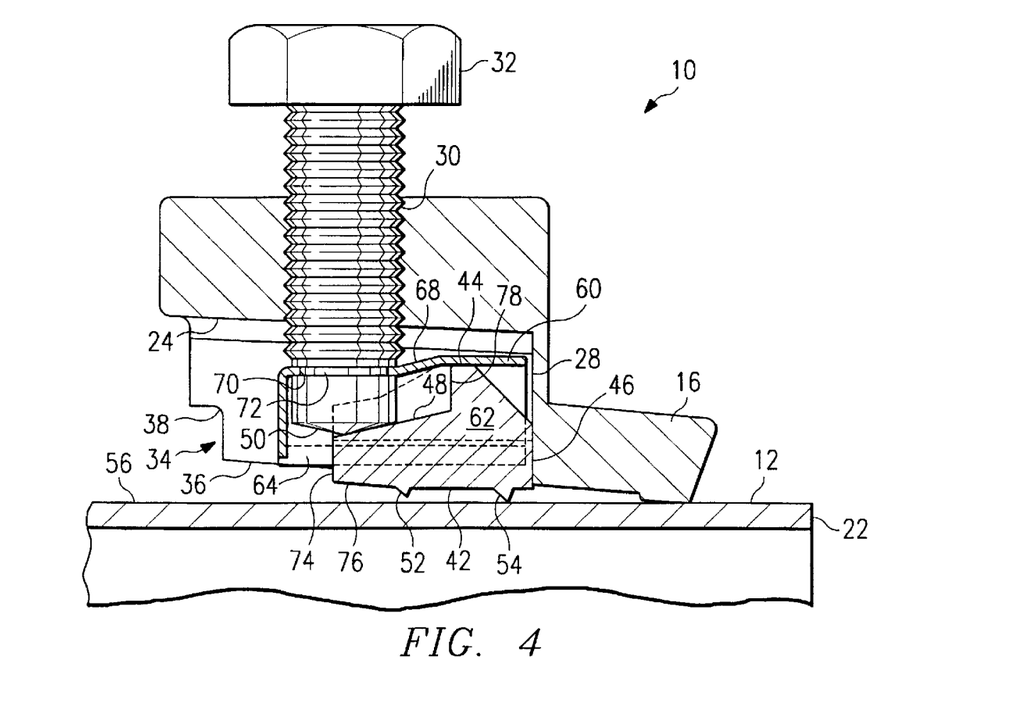
FIG. 4 is a section view of the joint restraint shown in FIG. 1 during actuation.
Figure 5:
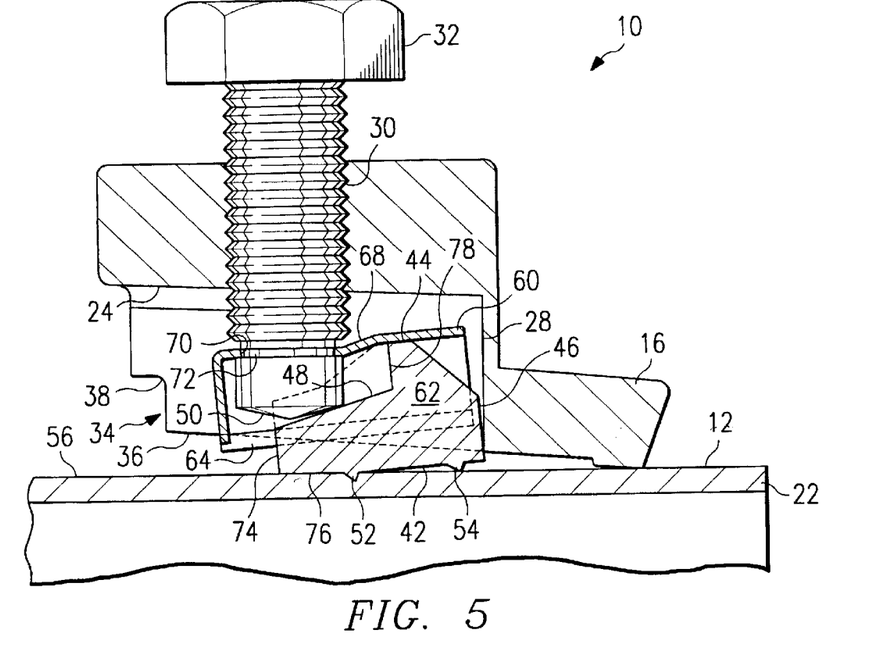
FIG. 5 is a section view of the joint restraint shown in FIG. 1 subsequent to actuation.

Installation of the joint restraint 10 of the present invention comprises the actuation sequence shown in FIGS. 3–5. For initial actuation, shown in FIG. 3, the threaded bolt 32 is rotated or torqued into the wedge pocket 34 such that the end 50 of the bolt 32 moves radially inward towards the pipe surface 56 and is received within the groove 48 in the top 44 of the wedge 40.

As shown in FIG. 4, continued rotation or torquing of the bolt 32 drives the wedge 40 towards the pipe surface 56 such that the wedge 40 is eventually disposed between and in contact with the end 50 of the bolt 32 and the pipe surface 56. The shroud 60 travels towards the pipe surface 56 with the bolt 32 and wedge 40. As shown in FIG. 5, with continued rotation or torquing of the bolt 32, the first tooth 52 is driven into and penetrates the pipe surface 56.

The second tooth 54 does not penetrate the pipe surface 56 during initial actuation because the force of the bolt 32 on the wedge 40 causes the wedge to pivot about an axis defined by the tooth 52 so that the bottom surface 42 of the wedge 40 between the first tooth 52 and the rear surface of the wedge 40 contacts the pipe surface 56. If the second tooth 54 contacts the pipe surface 56 before the first tooth 52, as shown in FIG. 4, continued rotation or torquing of the bolt 32 will cause the wedge 50 to rotate or pivot about the second tooth 54 until the first tooth 52 contacts the pipe surface 56. Preferably, the shroud 60 adapts to permit such rotation or pivoting to occur.

In a preferred embodiment of the present invention, the bottom surface 42 of the wedge 40 is tapered between the first tooth 52 and the rear surface 74 of the wedge 40 in order to form a bearing 76 that dissipates the actuation load of the bolt 32 on the wedge 40 over a relatively large area. After the first tooth 52 is fully embedded in the pipe surface 56, the bearing 76 is seated against the pipe surface 56 such that over-torquing does not result in penetration of the second tooth 54 into the pipe surface 56.

Those of ordinary skill in the art will recognize that the protection provided by the bearing 76 may be supplemented by using a torque wrench. Proper torquing and convenient installation of the wedge assemblies may also be ensured by providing a nut designed to shear at a predetermined torque (a "twist-off" nut).

An alternate bolt 84 employing a twist-off nut 86 is shown in FIG. 11. The twist-off nut 86 of the alternate bolt 84 can be identical in structure and operation to the twist-off nut disclosed in U.S. Pat. No. 4,627,774 to Bradley, the entire disclosure of which is incorporated herein by reference, with one exception: in the present invention, the thrust collar comprised by the Bradley device is unnecessary and is omitted.

Once the wedge 40 is actuated, motion of the first pipe 12 away from the second pipe, as occurs upon pressurization or other separation force, causes the first pipe 12 to shift relative to the annular body 14 and the bolt 32. The sequence is shown in FIGS. 5–7.

The connection between the annular body 14 and the flanged end of the second pipe is relatively rigid. As a result, the second pipe, annular body 14, bolt 32, and wedge housing 18 remain substantially stationary with respect to one another within the rated pressure of the joint restraint 10. The wedge 40, on the other hand, is embedded in the first pipe surface 56, and accordingly tends to travel with the first pipe 12.

Figure 6:
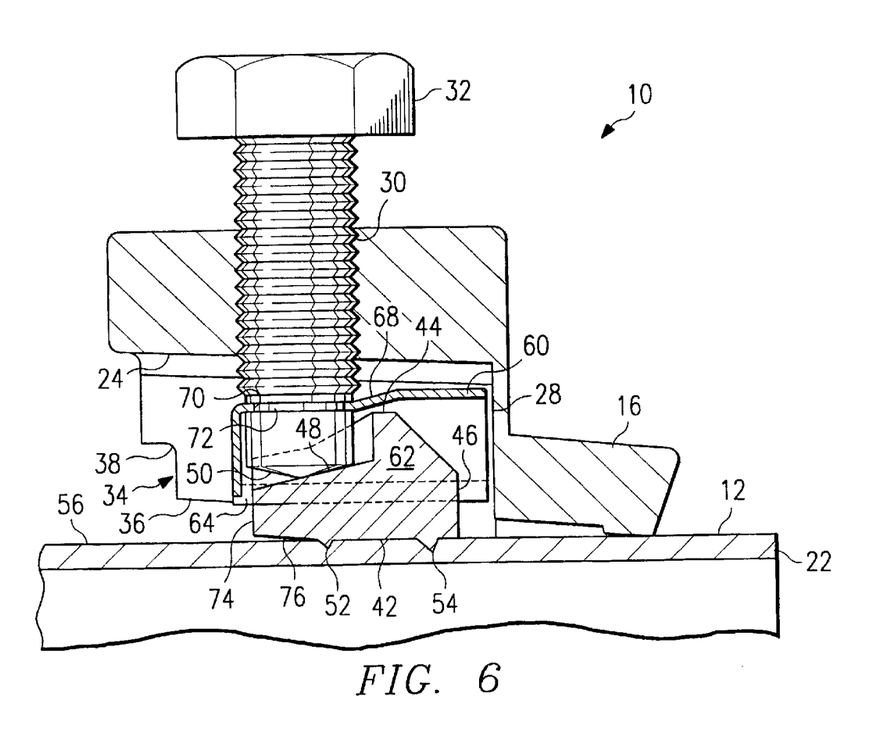
FIG. 6 is a section view of the joint restraint shown in FIG. 1 after pressurization.
Figure 7:
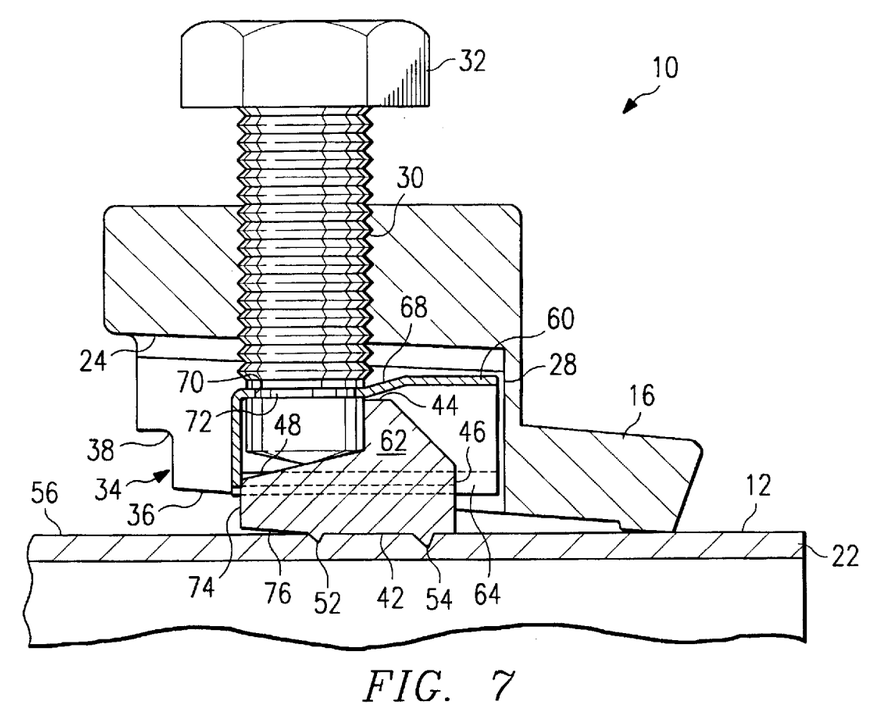
FIG. 7 is a section view of the joint restraint shown in FIG. 1 at high pressure.

As the wedge 40 begins to move with the pipe 12, it slides with respect to the stationary bolt 32, such that the bolt 32 moves relative to the groove 48 toward the front of the wedge 40, as shown in FIG. 6. The groove 48 is adapted to permit such relative motion within a certain range. Since the position of the bolt 32 is fixed, the sliding of the wedge 40 beneath the bolt 32 causes pivoting of the wedge 50 about the embedded first tooth 52, especially in the preferred embodiment in which the groove 48 has an upward slope. As a result, the second tooth 54 is driven into the pipe surface 56.

After the second tooth 54 is embedded in the pipe surface, further pivoting of the wedge 40 is inhibited, but the wedge 40 may still slide relative to the bolt 32 until interference with the front edge 78 of the groove 48 prevents further motion.

In a preferred embodiment, the front edge 78 of the groove 48 may comprise a raised lip 80 (shown in FIG. 8) to increase the contact area with the bolt 32, and, as is shown in FIGS. 8 and 9, the shroud 60 may comprise an arch 82 adapted to accommodate the raised lip 80.

Those of ordinary skill in the art will recognize that the joint restraint described above and shown in FIGS. 1–12 can be used in many other applications. For instance the joint restraint of the present invention can be used in conjunction with a plain ring to restrain a push-on joint in which the two rings are joined by connecting bolts. This type of application is similar to that disclosed in U.S. Pat. No. 4,336,959, the entire disclosure of which is incorporated herein by reference.

The joint restraint of the present invention can also be used in connection with a flanged pipe joint. Typically such flanges are fabricated as a part of the pipe. It is advantageous, at times, to cut pipe at a job location and be able to connect and restrain plain end pipe to a flange. The joint restraint of the present invention can be used to restrain this type of flange adapter in a manner similar to that described in U.S. Pat. No. 4,372,587, the entire disclosure of which is incorporated herein by reference.

While preferred embodiments of the invention have been shown and described, it will be understood by persons skilled in the art that various changes and modifications may be made without departing from the spirit and scope of the invention which is defined by the following claims.

What is claimed is:

1. A joint restraint for restraining the junction between a first pipe and a second pipe, wherein said joint restraint comprises:

(a) a substantially annular body;

(b) a wedge housing extending axially from said annular body, said wedge housing comprising a front wall, a top wall extending from said front wall, and at least one side wall connected to said front and top walls, said at least one side wall together with said front wall defining a bottom opening opposite said top wall, and said at least one side wall together with said top wall defining a rear opening opposite said front wall, wherein said top wall has a hole opening into said wedge housing;

(c) a bolt having an end;

(d) means for engaging said bolt within said hole in said top wall of said wedge housing; and (e) a wedge disposed within said wedge housing, said wedge comprising a front surface, a rear surface, a top surface and a bottom surface, said wedge further comprising at least one tooth extending from said bottom surface;

wherein said front surface of said wedge is adjacent said front wall of said wedge housing, said top surface of said wedge is adjacent said top wall of said wedge housing, and said end of said bolt is adjacent said top surface.

2. A joint restraint according to claim 1, wherein said top surface of said wedge comprises a groove and said end of said bolt is slidably received within said groove.

3. A joint restraint according to claim 2, wherein said groove has a slope that inclines from said rear surface of said wedge to said front surface of said wedge.

4. A joint restraint according to claim 2, wherein a raised lip is disposed along a terminus of said groove adjacent said front surface.

5. A joint restraint according to claim 1, wherein said bolt is threadedly engaged within said hole in said top wall of said wedge housing.

6. A joint restraint according to claim 1, wherein said wedge comprises a first tooth and a second tooth extending from said bottom surface.

7. A joint restraint according to claim 6, wherein said bottom surface, said first tooth and said second tooth are arcuate.

8. A joint restraint according to claim 6, wherein said second tooth is disposed between said first tooth and said front surface.

9. A joint restraint according to claim 6, wherein said second tooth is larger than said first tooth.

10. A joint restraint according to claim 6, wherein said second tooth is smaller than said first tooth.

11. A joint restraint according to claim 6, wherein said bottom surface of said wedge tapers toward said top surface between said first tooth and said rear surface.

12. A joint restraint according to claim 11, wherein upon initial actuation of said bolt with respect to said wedge, said first tooth penetrates a pipe surface, wherein upon further actuation of said bolt with respect to said wedge, said wedge pivots about said first tooth until said tapered portion of said bottom surface is adjacent to said pipe surface.

13. A joint restraint according to claim 12, wherein upon pressurization of said junction between said first pipe and said second pipe said wedge pivots about said first tooth until said second tooth penetrates said pipe surface.

14. A joint restraint according to claim 1, wherein said bolt comprises a twist-off nut.

15. A joint restraint according to claim 1, further comprising means for retaining said wedge within said wedge housing.

16. A joint restraint according to claim 15, wherein said retaining means comprise a member adapted to receive and retain said wedge, said member having an aperture adapted to receive said end of said bolt.

17. A joint restraint according to claim 16, wherein said bolt further comprises a groove for engaging said aperture of said member.

18. A joint restraint according to claim 16, wherein said bolt further comprises a flange for engaging said aperture of said member.

19. A joint restraint according to claim 16, wherein said bolt is threadedly engaged within said aperture of said member.

20. A joint restraint according to claim 16, wherein said wedge further comprises two side surfaces each comprising a flange, and wherein said member is adapted to engage said flanges.

21. A joint restraint according to claim 16, wherein said wedge further comprises two side surfaces each comprising a groove, and wherein said member is adapted to engage said grooves.

22. A joint restraint for restraining the junction between a first pipe and a second pipe, wherein said joint restraint comprises:
  (a) a substantially annular body;
  (b) a wedge housing extending axially from said annular body, said wedge housing comprising a front wall, a top wall extending from said front wall, and at least one side wall connected to said front and top walls, said at least one side wall together with said front wall defining a bottom opening opposite said top wall, and said at least one side wall together with said top wall defining a rear opening opposite said front wall, wherein said top wall has a hole opening into said wedge housing;
  (c) a bolt having an end;
  (d) means for engaging said bolt within said hole in said top wall of said wedge housing; and
  (e) a wedge disposed within said wedge housing, said wedge comprising a front surface, a rear surface, a top surface and a bottom surface, said wedge further comprising a first tooth and a second tooth extending from said bottom surface;
  wherein said second tooth is larger than said first tooth and is disposed between said first tooth and said front surface;
  wherein said bottom surface tapers toward said top surface between said first tooth and said rear surface; and
  wherein said front surface of said wedge is adjacent said front wall of said wedge housing, said top surface of said wedge is adjacent said top wall of said wedge housing, and said end of said bolt is engaged with said top surface of said wedge.

23. A joint restraint according to claim 22, wherein said bolt is threadedly engaged within said hole in said top wall of said wedge housing.

24. A joint restraint according to claim 22, wherein upon initial actuation of said bolt with respect to said wedge, said first tooth penetrates a pipe surface, wherein upon further actuation of said bolt with respect to said wedge, said wedge pivots about said first tooth until said tapered portion of said bottom surface is adjacent to said pipe surface.

25. A joint restraint according to claim 24, wherein upon pressurization of said junction between said first pipe and said second pipe, said wedge pivots about said first tooth until said second tooth penetrates said pipe surface.

26. A joint restraint according to claim 22, wherein said bottom surface, said first tooth and said second tooth are arcuate.

27. A joint restraint according to claim 22, wherein said bolt comprises a twist-off nut.

28. A joint restraint according to claim 22, further comprising means for retaining said wedge within said wedge housing.

29. A joint restraint according to claim 28, wherein said retaining means comprise a member adapted to receive and retain said wedge, said member having an aperture adapted to receive said end of said bolt.

30. A joint restraint according to claim 29, wherein said bolt further comprises a groove for engaging said aperture of said member.

31. A joint restraint according to claim 29, wherein said bolt further comprises a flange for engaging said aperture of said member.

32. A joint restraint according to claim 29, wherein said bolt is threadedly engaged within said aperture of said member.

33. A joint restraint according to claim 29, wherein said wedge further comprises two side surfaces each comprising a flange, and wherein said member is adapted to engage said flanges.

34. A joint restraint according to claim 29, wherein said wedge further comprises two side surfaces each comprising a groove, and wherein said member is adapted to engage said grooves.

35. A wedge for use in connection with a joint restraint, said wedge comprising:
  (a) a front surface;
  (b) a rear surface;
  (c) a top surface;
  (d) a bottom surface;
  (e) a first tooth extending from said bottom surface; and
  (f) a second tooth extending from said bottom surface;
  wherein said bottom surface comprises a portion tapering toward said top surface between said first tooth and said rear surface, and wherein said second tooth is larger than said first tooth and is disposed between said first tooth and said front surface.

36. A wedge according to claim 35, wherein upon initial bolt-driven actuation, said first tooth penetrates a pipe surface, wherein upon further bolt-driven actuation, said wedge pivots about said first tooth until said tapered portion of said bottom surface is adjacent to said pipe surface and wherein upon pressure-driven actuation said wedge pivots about said first tooth until said second tooth penetrates said pipe surface.

* * * * *